(12) United States Patent      (10) Patent No.:     US 12,643,384 B2
Reisch et al.                                   (45) Date of Patent:           Jun. 2, 2026

(54) TRANSMISSION AND VEHICLE WITH TRANSMISSION

(71) Applicant: ZF Friedrichshafen AG, Friedrichshafen (DE)

(72) Inventors: Matthias Reisch, Ravensburg (DE); Stefan Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/540,133

(22) Filed: Dec. 14, 2023

(65)            Prior Publication Data

US 2024/0116346 A1      Apr. 11, 2024

Related U.S. Application Data

(63) Continuation of application No. 17/605,666, filed as application No. PCT/EP2020/055630 on Mar. 4, 2020, now Pat. No. 11,884,146.

(30)         Foreign Application Priority Data

Apr. 23, 2019    (DE) .......................... 102019205750.0

(51) Int. Cl.
B60K 1/00          (2006.01)
F16H 48/11         (2012.01)
           (Continued)

(52) U.S. Cl.
CPC ................ B60K 1/00 (2013.01); F16H 48/11 (2013.01); B60K 2001/001 (2013.01);
           (Continued)

(58) Field of Classification Search
CPC ............... F16H 2048/106; F16H 48/11; B60K 2001/001; B60K 1/00; B60K 17/08
See application file for complete search history.

(56)                References Cited

U.S. PATENT DOCUMENTS 5,845,732 A * 12/1998 Taniguchi .............. B60K 17/16
                                                    180/65.6
9,303,745 B2 * 4/2016 Wenthen ............... F16H 37/082
           (Continued)

FOREIGN PATENT DOCUMENTS

DE          10348959 A1     5/2005
DE      102011079975 A1     1/2013
           (Continued)

OTHER PUBLICATIONS

Gear Handbook: The Design, Manufacture, and Application of Gears, Mcgraw-Hill (1962), pp. 3-14, 3-15.*
International Search Report and Written Opinion for PCT/EP2020/055630 mailed Apr. 17, 2020 (15 pages; with English translation).

*Primary Examiner* — Derek D Knight
(74) *Attorney, Agent, or Firm* — Dority & Manning, P.A.

(57)               ABSTRACT

The disclosure relates to a transmission comprising an input shaft, a first output shaft, a second output shaft, a first planetary gear set, and a second planetary gear set which is connected to the first planetary gear set. Each of the planetary gear sets comprises multiple elements. The input shaft, the two output shafts, the planetary gear sets, as well as the elements thereof are arranged and designed such that—a torque introduced via the input shaft is converted and is distributed to the two output shafts in a defined ratio, and the development of a sum torque is prevented. At least one element of the first planetary gear set is rotationally fixed to another element of the second planetary gear set. Another element of the second planetary gear set is secured to a rotationally fixed component.

16 Claims, 22 Drawing Sheets

(51) Int. Cl.
  *B60K 17/08*    (2006.01)
  *B60K 17/16*    (2006.01)
  *F16H 48/10*    (2012.01)

(52) U.S. Cl.
  CPC ............ *B60K 17/08* (2013.01); *B60K 17/165*
       (2013.01); *B60Y 2400/732* (2013.01); *F16H*
       *2048/104* (2013.01); *F16H 2048/106* (2013.01)

(56)                   References Cited

U.S. PATENT DOCUMENTS

| | | | | |
|---|---|---|---|---|
| 2011/0027105 | A1* | 2/2011 | Haupt ................. | F16H 61/0025 |
| | | | | 417/326 |
| 2017/0204942 | A1* | 7/2017 | Iuchi ......................... | F16H 3/66 |
| 2022/0324323 | A1* | 10/2022 | Beck .................... | B60K 17/165 |

FOREIGN PATENT DOCUMENTS

| | | | |
|---|---|---|---|
| DE | 102013210312 | A1 | 12/2014 |
| DE | 102014201255 | A1 | 7/2015 |
| DE | 102014209945 | A1 | 11/2015 |
| DE | 102015214035 | A1 | 1/2017 |
| DE | 102015222616 | A1 | 4/2017 |
| DE | 102017108002 | A1 | 10/2018 |
| DE | 102017111040 | A1 | 11/2018 |
| DE | 102018112880 | A1 | 12/2018 |
| DE | 102017212781 | A1 | 1/2019 |
| DE | 102018208044 | A1 | 11/2019 |
| WO | 2005120877 | A1 | 12/2005 |
| WO | 2017092740 | A1 | 6/2017 |

* cited by examiner

Ring gear of P2

Planet gear of P2

Sun gear of P2
= ring gear of P1

Planet gear of P1

Sun gear of P1

11

E21, PT1

E10, SO1

Planet gears

P1

E32, HO2

Planet gears

P2

| Claim | Figure | P1 | P2 | Calculation rule |
|-------|--------|-----|-----|------------------|
| 15 | 2, 3 | minus | minus | $i_{\alpha 2} = \dfrac{1}{i_{\alpha 1}} - 1$ |
| 16 | 8 | minus | minus | $i_{\alpha 2} = \dfrac{1}{i_{\alpha 1}} - 1$ |
| 17 | 9 | minus | minus | $i_{\alpha 2} = i_{\alpha 1} - 1$ |
| 18 | 4 | plus | minus | $i_{\alpha 2} = \dfrac{1}{1 - i_{\alpha 1}} - 1$ |
| 19 | 6 | minus | plus | $i_{\alpha 2} = 2 - \dfrac{1}{i_{\alpha 1}}$ |
| 20 | 5 | plus | plus | $i_{\alpha 2} = 2 + \dfrac{1}{i_{\alpha 1}} - 1$ |

Fig. 19

TRANSMISSION AND VEHICLE WITH TRANSMISSION

CROSS-REFERENCE TO RELATED APPLICATIONS

This application is a continuation application of U.S. patent application Ser. No. 17/605,666, filed on Oct. 22, 2021, which is a national stage of International Application No. PCT/EP2020/055630, filed Mar. 4, 2020, the disclosures of which are incorporated herein by reference in their entireties, and which claimed priority to German Patent Application No. 102019205750.0, filed Apr. 23, 2019, the disclosure of which is also incorporated herein by reference in its entirety.

TECHNICAL FIELD

The disclosure relates to a transmission, comprising an input shaft, a first output shaft, a second output shaft, a first planetary gear set and a second planetary gear set connected to the first planetary gear set, wherein the planetary gear sets each comprise multiple elements. The disclosure relates to a vehicle having a transmission of said type.

BACKGROUND

Transmissions are known from the prior art, for example from DE 10 2011 079 975 A1. A transmission of said type makes possible a torque conversion as a ratio of an output torque to an input torque and a speed ratio as a ratio of an input speed to an output speed.

What is needed is an alternative transmission which, in particular, has a shorter axial length and is mechanically less complex.

SUMMARY

The object is achieved by a transmission having the features of patent claim 1 and by a vehicle having the features of patent claim 16.

Proceeding from the known transmission described above, the transmission includes an input shaft, two output shafts, the planetary gear sets and elements thereof are arranged and configured such that a torque introduced via the input shaft is converted and divided between the two output shafts in a defined ratio, and the generation of a sum torque is prevented. At least one element of the first planetary gear set is connected to another element of the second planetary gear set, and a further element of the second planetary gear set is fixed to a non-rotatable structural element.

In the context of the disclosure, a "shaft" is to be understood to mean a rotatable structural part of the transmission, via which respectively associated components of the transmission are connected rotationally conjointly to one another or via which such a connection is established when a corresponding shift element is actuated. The respective shaft may in this case connect the components to one another axially or radially or both axially and radially. The respective shaft may thus also be present as an intermediate piece, via which a respective component is connected radially, for example.

In one exemplary arrangement, the elements are in the form of sun gear, planet carrier and ring gear.

In the context of the disclosure, "axial" means an orientation in the direction of a longitudinal central axis along which the planetary gear sets are arranged so as to lie coaxially with respect to one another. "Radial" is then to be understood to mean an orientation in the diameter direction of a shaft which lies on said longitudinal central axis.

If an element is fixed, it is prevented from rotating. In one exemplary arrangement, the non-rotatable structural element of the transmission may be a permanently static component, a housing of the transmission, a part of such a housing or a structural element connected to said housing in a non-rotatable manner.

In contrast to the prior art, no sum torque is generated, for example at a differential cage. Preventing the generation of a sum torque means that no rotating structural element (input shaft, output shafts, elements of the planetary gear sets) is subjected to the sum of the individual torques acting in the two output shafts, as is the case in differentials known from the prior art.

The transmission may for example be designed such that the input shaft is connected rotationally conjointly to a first element of the first planetary gear set; the first output shaft is connected rotationally conjointly to a second element of the first planetary gear set; wherein a third element of the first planetary gear set is connected rotationally conjointly to a first element of the second planetary gear set; wherein a second element of the second planetary gear set is fixed to a non-rotatable structural element of the transmission; the second output shaft is connected rotationally conjointly to a third element of the second planetary gear set.

Thus, a transmission is provided which can, by a single integral assembly, implement the two functions of torque conversion and torque distribution, which was previously achieved by two separate assemblies. The disclosure therefore constitutes a combined transmission gearing and differential transmission, which on the one hand can implement a torque conversion with the aid of a housing support and on the other hand can implement the torque distribution to the output shafts. The term "integrated differential" may also be used in this context.

The specification of the torque conversion is to be understood as follows:

The transmission has two output shafts, the torque sum of which, in relation to the input torque, describes the conversion of the transmission. The speed ratio of the respective output shaft is initially not defined. It is the coupling of the two output shafts, for example via the wheels of the vehicle on a roadway, that first generates defined rotational speeds. If both output shafts rotate at the same rotational speed, for example during straight-ahead travel, then, as in the prior art, the speed ratio can be formed as a rotational speed ratio between the input rotational speed and one of the two identical output rotational speeds. In all other cases, it is not possible to use the common definition of torque conversion/speed ratio to specify a speed ratio of the transmission.

The two planetary gear sets may be arranged axially adjacent to one another. The first planetary gear set may however also be arranged radially within the second planetary gear set. The latter exemplary arrangement is also referred to as a nested arrangement of the planetary gear sets.

In one exemplary arrangement, toothings of the two interconnected elements of the first and second planetary gear sets, that is to say of the third element of the first planetary gear set and of the first element of the second planetary gear set, are formed on the same structural part.

In one exemplary arrangement, a pitch of the toothing on the third element of the first planetary gear set and on the first element of the second planetary gear set is identical. The identical pitch allows the connecting structural part or the coupling shaft to be free from axial forces, such that an expensive axial bearing can be omitted.

The pitch or lead of a helical toothing is to be understood to mean the axial path, measured along an associated axis of rotation, which is required for an imaginary continuation of a tooth beyond the actual width of the toothed gear in order to realize a 360° loop of the tooth around the axis. In the case of threads, the term thread pitch is commonly used in an analogous manner. A helically toothed gear with multiple teeth is thus comparable to a multi-start thread. In the case of spindles, the word lead is also commonly used for the corresponding dimension.

In one exemplary arrangement, the input shaft is connected to a drive machine, for example, an electric machine or an internal combustion engine, for the introduction of a torque into the transmission. In the case of the electric machine, in one exemplary arrangement, the rotor of the electric machine is connected rotationally conjointly to the input shaft. In one exemplary arrangement, the rotor is connected to the input shaft via at least one speed ratio stage.

In one exemplary arrangement, the electric machine may be arranged so as to lie either coaxially with respect to the planetary gear sets or axially parallel with respect thereto. In the first-mentioned case, the rotor of the electric machine may in this case either be directly connected rotationally conjointly to the input shaft or else coupled thereto via one or more interposed speed ratio stages, wherein the latter allows a more cost-effective design of the electric machine with higher rotational speeds and lower torque. The at least one speed ratio stage may in this case be designed as a spur gear stage and/or as a planetary stage.

If, by contrast, the electric machine is provided so as to be axially offset with respect to the planetary gear sets, a coupling is thus realized via one or more interposed speed ratio stages and/or a traction mechanism drive. The one or more speed ratio stages may in this case also be implemented specifically either as a spur gear stage or as a planetary stage. A traction mechanism drive may be either a belt drive or a chain drive.

In the case of a coaxial arrangement of the electric machine, in one exemplary arrangement, the first output shaft is guided through the rotor of the electric machine. This makes the transmission with electric machine particularly corn pact.

In one exemplary arrangement, the static transmission ratio of the second planetary set is calculated at least approximately from the reciprocal of the static transmission ratio of the first planetary set minus 1, that is to say:

$$i_{02} = \frac{1}{i_{01}} - 1.$$

In the event that the two planetary gear sets are designed as minus planetary gear sets (for example as per FIG. 2 or 3), this calculation rule has the effect that, if transmission losses are neglected, the output torque is respectively divided equally between the two output shafts. This is particularly advantageous if the arrangement of the disclosure is used for distributing the torque between two wheels on the same axle.

If a different torque distribution is desired or if the planetary gear sets are designed differently (for example FIGS. 4 to 9), a calculation rule can thus be defined analogously (FIG. 19). The wording "at least approximately" is used because, during operation under real conditions, the asymmetrical transmission losses in the direction of the two output shafts can have the effect that a slight deviation from the calculation rule is advantageous in order to obtain the same output torques at both shafts. This wording is used also because it is sometimes not possible to exactly adhere to the calculation rule while adhering to integer numbers of teeth and favorable combinations of numbers of teeth, for example with regard to acoustic requirements.

In FIG. 19, the calculation rules of the respective dependency of the static speed ratio of the second planetary gear set on the static speed ratio of the first planetary gear set are analogously specified for predetermined gear set combinations. If transmission losses are disregarded, these each give rise to an output torque of equal magnitude and with the same sign at both output shafts.

In one exemplary arrangement, the number of planets of the second planetary gear set is greater than the number of planets of the first planetary gear set. Despite the application of the abovementioned calculation rule, a high transmission ratio can be implemented by this configuration, which in turn makes possible a particularly compact and cost-effective electric machine.

In one exemplary arrangement, the second planetary gear set has five, six, seven or eight planets. In one exemplary arrangement, the first planetary gear set has three or four planets.

A further positive effect of the large or relatively large number of planets on the second planetary gear set is that, in this way, the sun gear and/or ring gear of the second planetary gear set can be made very thin-walled and thus lightweight, cost-effective and space-saving.

The large or relatively large number of planets furthermore allows the toothing forces to be introduced more uniformly into the sun gear and/or the ring gear. This gives rise to less elastic deformation of the sun gear and of the ring gear.

In addition, by a large number of planets on the second planetary gear set, the mounting of that shaft that connects the first and second planetary gear sets can be improved. This is therefore possible because the planet gears of the second planetary gear set are mounted so as to be fixed to the housing, and said shaft is centered in said planet gears.

It is self-evidently the case that, even without using the calculation rule, the number of the second planetary gear set may be greater than that of the first planetary gear set.

In one exemplary arrangement, the drive machine is installed transversely with respect to a direction of travel. In one exemplary arrangement, the two output shafts are connected rotationally conjointly to the wheels of a vehicle.

In one exemplary arrangement, the two output shafts distribute the introduced torque between different axles of a vehicle. An arrangement as a longitudinal transfer box (also called longitudinal transfer case) can thus be implemented, that is to say a transmission that distributes the introduced torque, for example, between multiple axles, and in one particular arrangement, between a front axle and a rear axle of a vehicle.

The torque distribution of the transmission does not need to be uniform between the output shafts. In particular in the case of the exemplary arrangement as a longitudinal transfer box, a non-uniform distribution between one and the other axle may be realized. For example, the torque provided by the input shaft may be distributed such that 60% is directed to the rear axle and 40% to the front axle.

The two planetary gear sets may be designed both as a minus or a plus planetary gear set. A combination of minus and plus planetary gear sets is also possible.

A minus planetary set is, in a manner known in principle to a person skilled in the art, made up of the elements sun gear, planet carrier and ring gear, wherein the planet carrier guides at least one but in one exemplary arrangement, multiple planet gears in rotatably mounted fashion, which planet gears specifically mesh in each case with both the sun gear and the surrounding ring gear.

In the case of a plus planetary set, it is likewise the case that the elements sun gear, ring gear and planet carrier are present, wherein the latter guides at least one planet gear pair, in the case of which one planet gear is in tooth meshing engagement with the inner sun gear and the other planet gear is in tooth meshing engagement with the surrounding ring gear, and the planet gears mesh with one another.

Where a connection of the individual elements is possible, a minus planetary set can be converted into a plus planetary set, wherein, then, in relation to the arrangement of a minus planetary set, the ring gear and the planet carrier connections must be interchanged with one another and the magnitude of a static transmission ratio must be increased by one. Conversely, it would also be possible for a plus planetary set to be replaced by a minus planetary set, if the connection of the elements of the transmission allows this. In this case, in relation to the plus planetary set, the ring gear and the planet carrier connection would then likewise have to be interchanged with one another, and a static transmission ratio would have to be reduced by one, and the sign would have to be changed. In the context of the disclosure, however, the two planetary gear sets are preferably each designed as a minus planetary set.

In one exemplary arrangement, both planetary gear sets are designed as minus planetary gear sets. These have good efficiency and can be arranged axially adjacent to one another and nested radially.

In the case of a combination of minus and plus planetary gear sets in a nested arrangement, in one exemplary arrangement, the radially inner planetary gear set is a minus planetary gear set and the radially outer planetary gear set is a plus planetary gear set. Here, on the one hand, an easily implemented nesting capability is maintained. In addition, in this context, the fixed ring gear also offers the advantage that the (normally) relatively poor efficiency caused by the plus planetary gear set only affects a single output shaft.

In the context of the disclosure, it is additionally possible for a transmission gearing or a multi-ratio transmission, preferably a 2-ratio transmission, to be connected upstream of the transmission. This transmission gearing or multi-ratio transmission may then also be a constituent part of the transmission and serves to configure an additional speed ratio by, for example, converting the rotational speed of the drive machine and driving the input shaft with this converted rotational speed. The multi-ratio transmission or transmission gearing may in one exemplary arrangement, be in the form of a planetary transmission.

In one exemplary arrangement, the elements of the transmission may be configured as follows:

a) Transmission with two minus planetary gear sets, wherein
the first element of the first planetary gear set is a sun gear,
the second element of the first planetary gear set is a planet carrier and
the third element of the first planetary gear set is a ring gear, and wherein
the first element of the second planetary gear set is a sun gear, the second element of the second planetary gear set is a planet carrier and
the third element of the second planetary gear set is a ring gear.

This transmission could be referred to as a first concept with two minus planetary gear sets.

b) Transmission with two minus planetary gear sets, wherein
the first element of the first planetary gear set is a sun gear,
the second element of the first planetary gear set is a ring gear and
the third element of the first planetary gear set is a planet carrier, and wherein
the first element of the second planetary gear set is a ring gear,
the second element of the second planetary gear set is a planet carrier and
the third element of the second planetary gear set is a sun gear.

This transmission could be referred to as a second concept with two minus planetary gear sets.

c) Transmission with two minus planetary gear sets, wherein
the first element of the first planetary gear set is a ring gear,
the second element of the first planetary gear set is a planet carrier and
the third element of the first planetary gear set is a sun gear, and wherein
the first element of the second planetary gear set is a sun gear,
the second element of the second planetary gear set is a planet carrier and
the third element of the second planetary gear set is a ring gear.

This transmission could be referred to as a fifth concept with two minus planetary gear sets.

d) Transmission with one plus and one minus planetary gear set, wherein the second planetary gear set is the minus planetary gear set, wherein
the first element of the first planetary gear set is a sun gear,
the second element of the first planetary gear set is a ring gear and
the third element of the first planetary gear set is a planet carrier, and wherein
the first element of the second planetary gear set is a sun gear,
the second element of the second planetary gear set is a planet carrier and
the third element of the second planetary gear set is a ring gear.

This transmission is, as it were, the first concept with one plus planetary gear set.

e) Transmission with one plus and one minus planetary gear set, wherein the first planetary gear set is the minus planetary gear set, wherein
the first element of the first planetary gear set is a sun gear,
the second element of the first planetary gear set is a planet carrier and
the third element of the first planetary gear set is a ring gear, and wherein
the first element of the second planetary gear set is a sun gear,
the second element of the second planetary gear set (P2) is a ring gear and the third element of the second planetary gear set is a planet carrier.

This transmission is, as it were, the first concept with one plus planetary gear set.

f) Transmission with two plus planetary gear sets, wherein the first element of the first planetary gear set is a sun gear, the second element of the first planetary gear set is a ring gear and the third element of the first planetary gear set is a planet carrier, and wherein the first element of the second planetary gear set is a sun gear, the second element of the second planetary gear set is a ring gear and the third element of the second planetary gear set is a planet carrier.

This transmission is, as it were, the first concept with two plus planetary gear sets.

In one exemplary arrangement, the transmission is part of a motor vehicle drivetrain for a hybrid or electric vehicle and is then arranged between a drive machine, configured as an internal combustion engine or electric machine, of the motor vehicle and further components of the drivetrain which follow in the direction of power flow to drive wheels of the motor vehicle. Here, the input shaft of the transmission is coupled to a crankshaft of the internal combustion engine or to the rotor shaft of the electric machine. The transmission may also be part of a drivetrain for a conventional motor vehicle, that is to say a vehicle that is driven only by an internal combustion engine.

The statement that two structural elements of the transmission are rotationally conjointly "connected" or "coupled" or "connected to one another" means, within the context of the invention, a permanent coupling of these structural elements such that they cannot rotate independently of one another. In this respect, no shift element is provided between these structural elements, which may be elements of the planetary gear sets and/or also shafts and/or a non-rotatable structural element of the transmission, but the corresponding structural elements are fixedly coupled to one another. A rotationally elastic connection between two structural parts is also understood to be rotationally conjoint. In particular, a rotationally conjoint connection may also include joints, for example in order to allow a steering movement or a spring compression movement of a wheel.

According to another aspect, a drivetrain for a vehicle is provided which has a transmission with the features described above. The advantages of the transmission also have an effect on a drivetrain with a transmission of said type. According to a further aspect, a vehicle is provided which has a drivetrain with a transmission with the features described above. The advantages of the transmission also have an effect on a vehicle with a transmission of said type. Overall, the disclosure makes it possible to provide a transmission and a vehicle with a transmission of said type which has an integral design, that is to say torque conversion and torque distribution, as well as a compact and axially short design (in particular in the case of a nested arrangement). In addition, the transmission is characterized by good efficiency and low costs owing to low complexity. Significantly lower toothing forces occur. In addition, the problem of seizing can be reduced. Furthermore, an extremely low locking ratio can be realized.

The disclosure is not restricted to the stated combination of the features of the main claim or of the claims dependent thereon. Possibilities additionally arise for combining individual features with one another, also insofar as they emerge from the claims, from the following description of exemplary arrangements of the disclosure or directly from the drawings. The reference by the claims to the drawings through the use of reference designations is not intended to limit the scope of protection of the claims.

BRIEF DESCRIPTION OF DRAWINGS

Advantageous exemplary arrangements of the disclosure, which will be discussed below, are illustrated in the drawings. In the drawings:

FIG. 19 shows an overview of the static transmission ratios of the individual exemplary arrangements.

DETAILED DESCRIPTION

FIGS. 1a to 1e each show a schematic view of a transmission G of a motor vehicle drivetrain 100 of a vehicle 1000 in the form of a passenger motor vehicle.

Figure 1A:
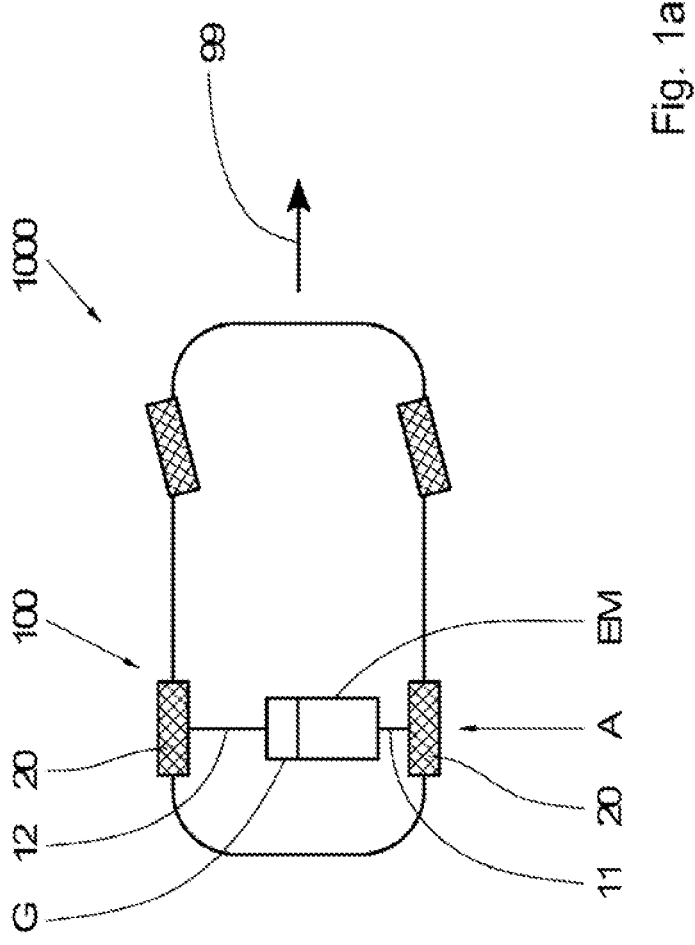
FIGS. 1a-1e show a schematic view of a motor vehicle drivetrain.

The drivetrain 100 as per FIG. 1a shows an electric drive which drives a rear axle A of the vehicle 1000. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1a, the transmission G and the electric machine EM are oriented transversely with respect to the direction of travel of the vehicle.

Figure 1B:
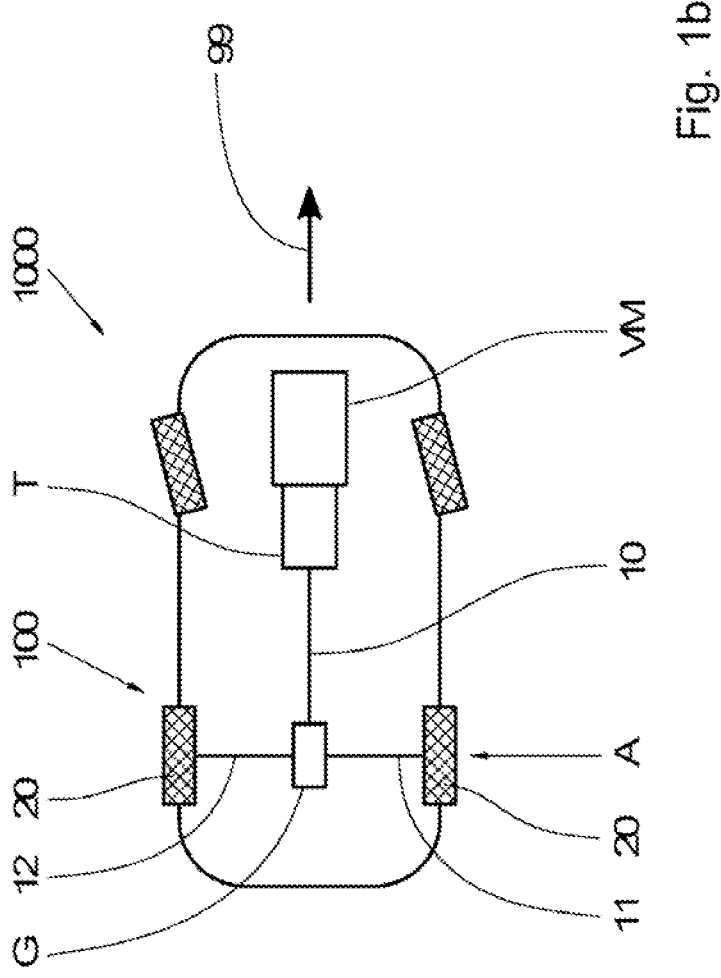

The drivetrain 100 as per FIG. 1b shows an internal combustion engine drive which drives the rear axle A of the vehicle 1000. The drivetrain comprises a transmission G, which divides the drive torque of the internal combustion engine VM between two output shafts 11 and 12, wherein a further transmission T, for example an automatic transmission of the vehicle, is arranged between the transmission G and the internal combustion engine VM. The forward direction of travel is illustrated by arrow 99. As can also be seen in FIG. 1b, the transmission G and the internal combustion engine VM are oriented longitudinally with respect to the direction of travel of the vehicle.

Figure 1C:
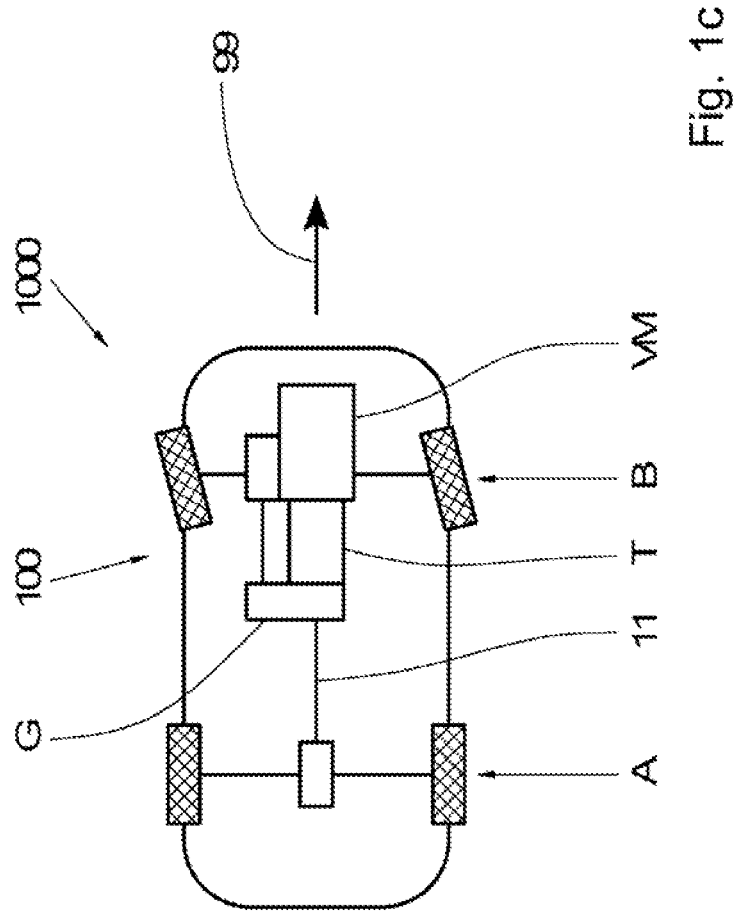

The drivetrain 100 as per FIG. 1c shows an internal combustion engine drive which drives the rear axle A and the front axle B of the vehicle 1000. The drivetrain comprises a transmission G, which divides the drive torque of the internal combustion engine VM between the axles A and B, wherein a further transmission T, for example an automatic transmission of the vehicle, is arranged between the transmission G and the internal combustion engine VM. The transmission G may then be connected via an output shaft 11 to an axle differential of the rear wheel axle A and via an output shaft 12 to an axle differential of the front axle B. The forward direction of travel is illustrated by arrow 99. As can also be seen in FIG. 1c, the transmission G and the internal combustion engine VM are oriented longitudinally with respect to the direction of travel of the vehicle.

Figure 1D:
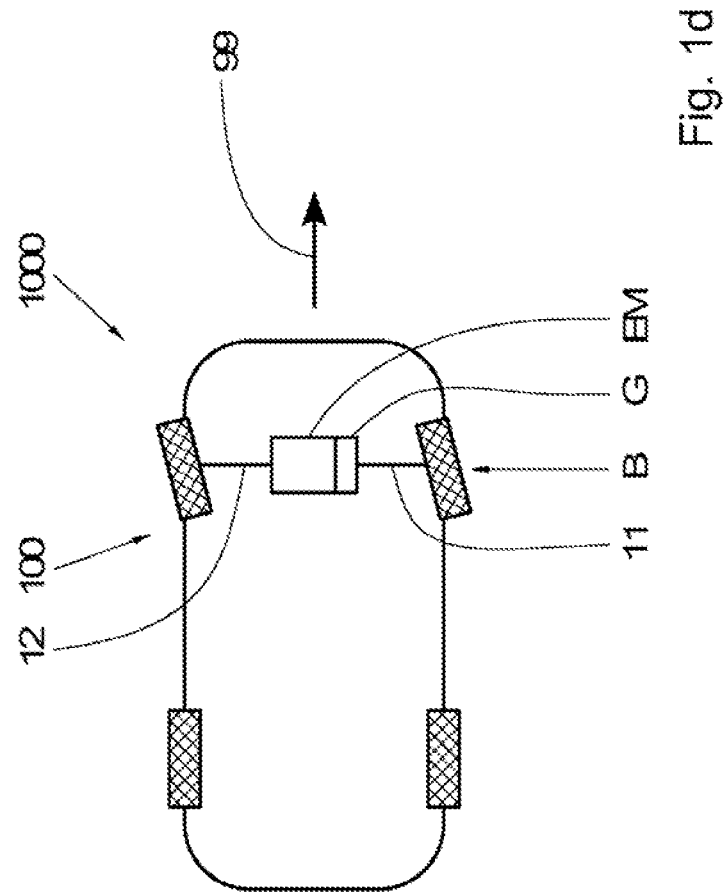

The drivetrain 100 as per FIG. 1d shows an electric drive which drives the front axle B of the vehicle 1000, that is to say an electric front transverse drive. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1d, the transmission G and the electric machine EM are oriented transversely with respect to the direction of travel of the vehicle.

Figure 1E:
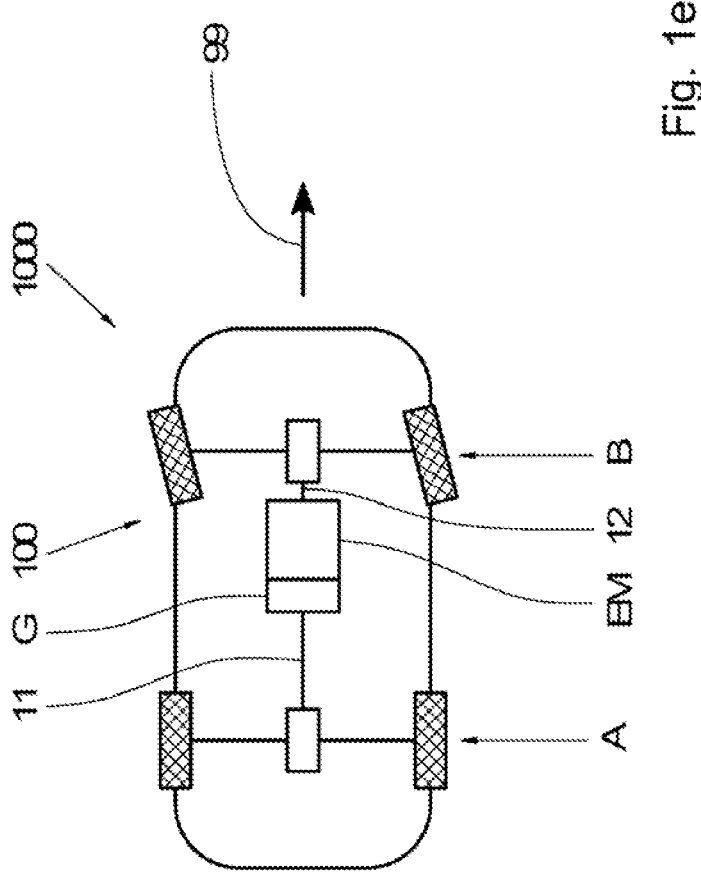

The drivetrain 100 as per FIG. 1e shows an electric all-wheel drive which drives the rear axle A and the front axle B of the vehicle 1000. This involves a transmission designed as a longitudinal transfer case. The drivetrain comprises a transmission G, which divides the drive torque of the electric machine EM between two output shafts 11 and 12. The output shaft 11 transmits the torque to the front axle B, whereas the output shaft 12 transmits the torque to the rear axle A. The respective torques are then in turn introduced into respective axle differentials. The transmission G and the electric machine are arranged in a common housing. The forward direction of travel is illustrated by arrow 99. As can also be seen in FIG. 1e, the transmission G and the electric machine EM are oriented transversely with respect to the direction of travel of the vehicle.

Figure 2:
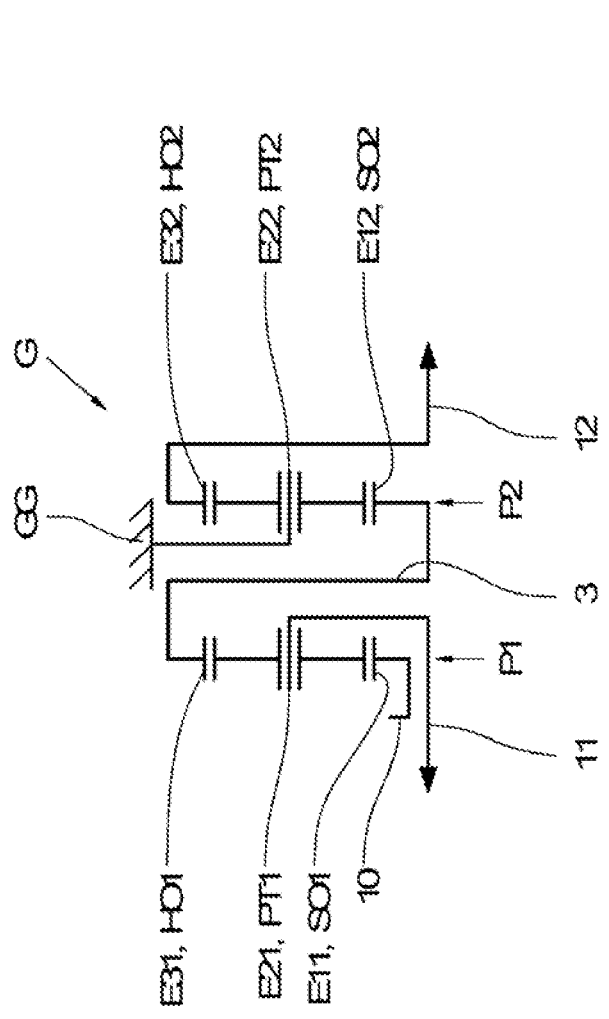
FIGS. 2-5 show a schematic view of a respective transmission such as can be used in the respective motor vehicle drivetrain from FIGS. 1a-1e, in a respective exemplary arrangement.

FIG. 2 shows a transmission G in a first exemplary arrangement. The transmission G comprises an input shaft 10, a first output shaft 11, a second output shaft 12, a first planetary gear set P1 and a second planetary gear set P2 which is connected to the first planetary gear set P1. In the present exemplary arrangement, the planetary gear sets P1 and P2 are each designed as a minus planetary gear set. The planetary gear sets P1, P2 each comprise multiple elements E11, E21, E31, E12, E22, E32, wherein the first element E11 is a sun gear SO1 the second element E21 is a planet carrier PT1 and the third element E31 of the first planetary gear set P1 is a ring gear HO1. In the case of the second planetary gear set P2, the first element E12 is a sun gear SO2, the second element E22 is a planet gear carrier PT2 and the third element E32 is a ring gear HO2. The planet gear carriers PT1, PT2 each support multiple planet gears, which are illustrated but not designated. The planet gears mesh both with the respective radially inner sun gear and with the respective surrounding ring gear. The input shaft 10, the first output shaft 11 and the second output shaft 12 are arranged coaxially with respect to one another. The two planetary gear sets P1, P2 are likewise arranged coaxially with respect to one another.

In the present exemplary arrangement, the input shaft 10 is connected rotationally conjointly to the first element E11. The first output shaft 11 is connected rotationally conjointly to the second element E21 of the first planetary gear set. The second output shaft 12 is connected rotationally conjointly to the third element E32 of the second planetary gear set. The third element E31 of the first planetary gear set P1 is connected rotationally conjointly to the first element E12 of the second planetary gear set P2, whereas the second element E22 of the second planetary gear set P2 is fixed to a non-rotatable structural element GG. The non-rotatable structural element GG is a transmission housing of the transmission G.

The third element E31, that is to say the ring gear HO1 of the first planetary gear set P1, and the first element E12, that is to say the sun gear SO2 of the second planetary gear set, form a common structural part, which in the present case is in the form of a shaft 3.

As can be seen in FIG. 2, the input shaft 10, the first output shaft 11 and the second output shaft 12 are arranged coaxially with respect to one another. The two planetary gear sets P1, P2 are likewise arranged coaxially with respect to one another. According to this exemplary arrangement, the two planetary gear sets P1, P2 are arranged so as to be axially spaced apart from one another.

The input shaft 10 may be connected to a drive machine and thus introduce an input torque into the transmission G. That is to say, the input shaft and output shafts rotate in the same direction. Through the connection of the two planetary gear sets P1, P2 to one another and the support of the second element E22 on the housing GG, the introduced input torque can be distributed between the two output shafts 11, 12. In this case, the transmission performs not only the function of a transmission gearing but additionally that of a differential gear. That is to say, the introduced torque is not only subjected to a speed ratio but is also distributed between various output shafts. In this exemplary arrangement, no reversal of the direction of rotation occurs.

Figure 3:
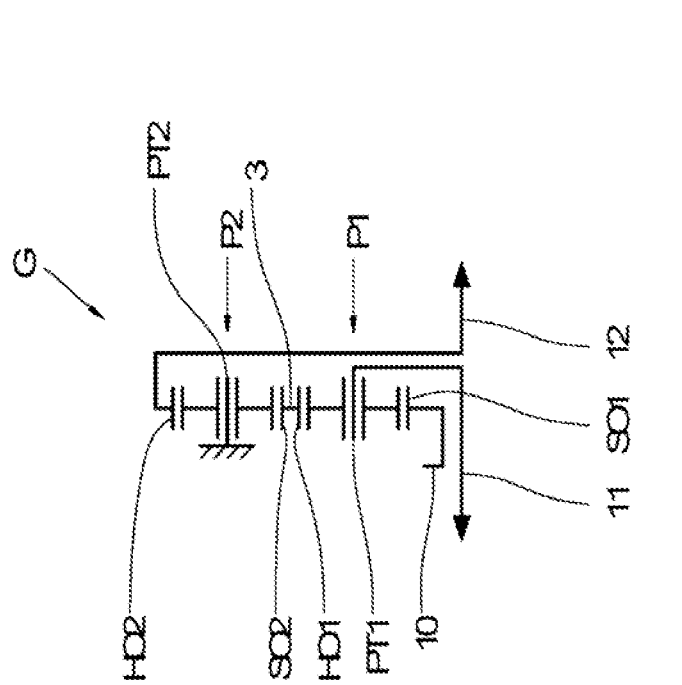

FIG. 3 shows a further exemplary arrangement of the transmission G. In contrast to the arrangement as per FIG. 2, the arrangement as per FIG. 3 shows a radially nested arrangement of the two planetary gear sets P1, P2. Whereas the exemplary arrangement as per FIG. 2 proposes an extremely radially compact solution, the exemplary arrangement as per FIG. 3 makes possible an extremely axially compact transmission G. The first planetary gear set P1 in this case forms the radially inner planetary gear set. The second planetary gear set P2 forms the radially outer planetary gear set. The first planetary gear set P1 is accordingly situated radially within the second planetary gear set P2. In this exemplary arrangement, too, the connection of the first ring gear HO1 of the first planetary gear set P1 to the sun gear SO2 of the second planetary gear set is configured as a single structural part, which in the present case is likewise in the form of a shaft 3. It is likewise the case in this arrangement that no reversal of the direction of rotation occurs.

Figure 4:
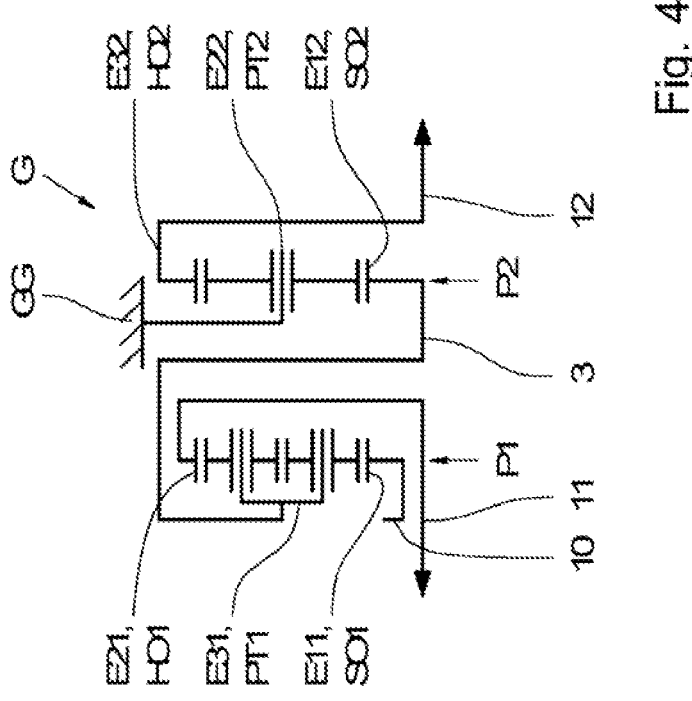

FIG. 4 shows a transmission G in a further exemplary arrangement. By contrast to FIG. 2, the first planetary gear set P1 is now configured as a plus planetary gear set. That is to say, the third element E31 of the first planetary gear set is configured as a planet gear carrier, which is connected rotationally conjointly to the first element E12 of the second planetary gear set, that is to say the sun gear SO2. The second element E21 is now configured as a ring gear HO1 and is connected rotationally conjointly to the first output shaft 11. The third element E31 of the first planetary gear set and the first element E12 of the second planetary gear set are in turn formed on the same structural part, which in the present case is in the form of a shaft 3. Reference is otherwise made to the statements relating to FIG. 2.

Figure 5:
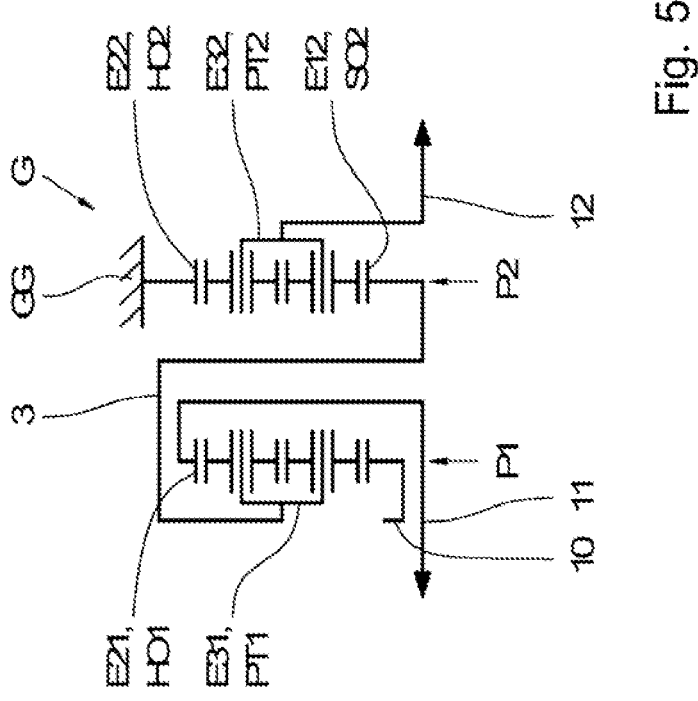

FIG. 5 shows a further exemplary arrangement of the transmission G. In contrast to the shown in FIG. 2, it is now the case that both planetary gear sets P1, P2 are configured as plus planetary gear sets. Thus, the second element E21 is configured as a ring gear HO1 and is connected rotationally conjointly to the first output shaft 11. The third element E31 is now configured as a planet carrier PT1 and is connected rotationally conjointly to the first element E12, that is to say the sun gear SO2 of the second planetary gear set P2. The second element E22 of the second planetary gear set P2 is now configured as the ring gear HO2 and is fixed to the non-rotatable structural element GG. By contrast, the third element E32 of the second planetary gear set P2 is configured as a planet carder PT2 and is connected rotationally conjointly to the second output shaft 12.

Thus, in the case of the two planetary gear sets P1, P2, the planet carder and ring gear connections have been interchanged. Reference is otherwise made to the statements relating to FIG. 2.

Figure 6:
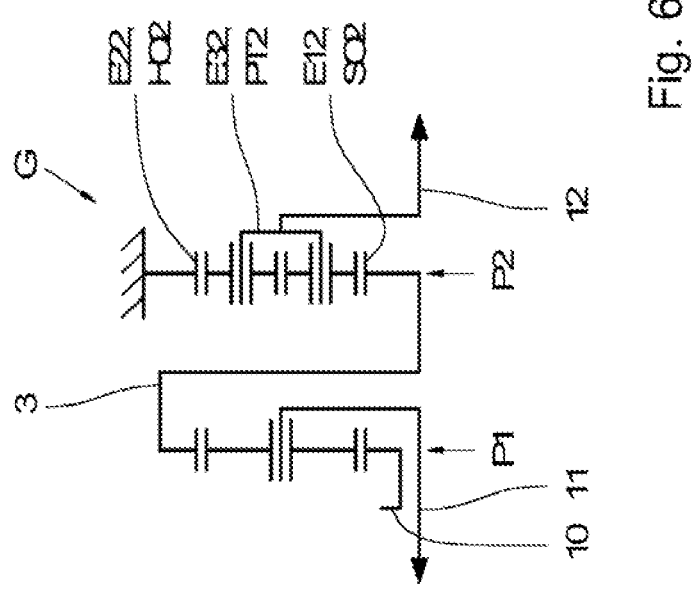
FIG. 6 shows a schematic view of a transmission such as can be used in the respective motor vehicle drivetrain from FIGS. 1a-1e, in a further exemplary arrangement.

FIG. 6 shows a transmission in a further exemplary arrangement. In contrast to the arrangement as per FIG. 2, the second planetary gear set P2 is now configured as a plus planetary gear set, whereas the first planetary gear set P1 remains unchanged. Thus, the ring gear HO2 of the second planetary gear set P2 is fixed to the housing GG. In addition, the planet carrier PT2 is connected rotationally conjointly to the second output shaft 12. The planet carrier and ring gear connections of the second planetary gear set have thus been interchanged. Reference is otherwise made to the statements relating to FIG. 2.

Figure 7:
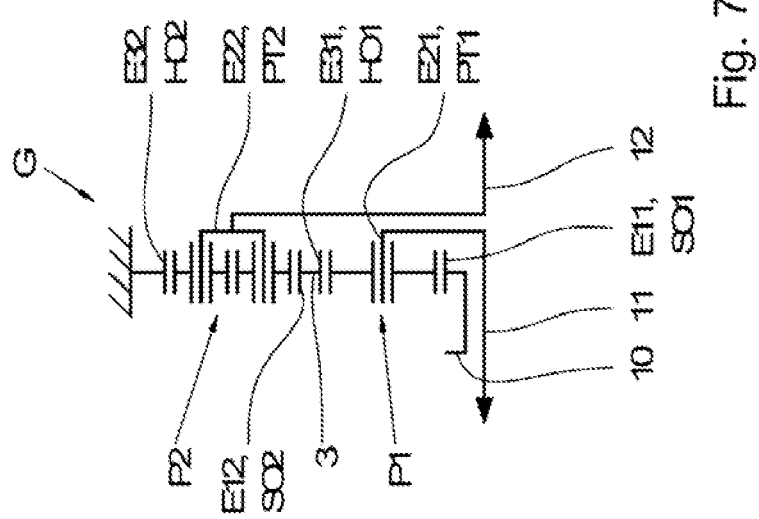
FIGS. 7-9 show a schematic view of a respective transmission such as can be used in the respective motor vehicle drivetrain from FIGS. 1a-1e, in a respective further exemplary arrangement.

FIG. 7 shows a further exemplary arrangement of the transmission G. In contrast to the exemplary arrangement as per FIG. 6, the arrangement as per FIG. 7 provides radially nested planetary gear sets P1, P2. The planetary gear set situated radially at the inside is the first planetary gear set P1. The planetary gear set situated radially at the outside is the second planetary gear set P2. Reference is otherwise made to the statements relating to FIGS. 6 and 2.

Figure 8:
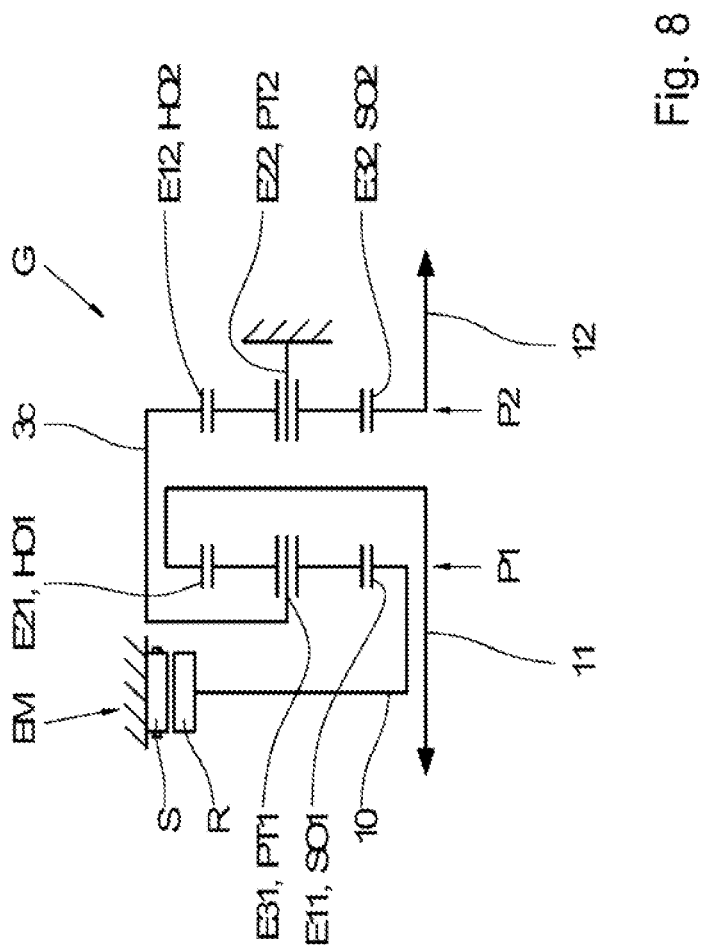

FIG. 8 shows the transmission G in a further exemplary arrangement. This arrangement has the following differences in relation to the arrangement as per FIG. 2. Firstly, a drive machine in the form of an electric machine EM is provided. The electric machine EM comprises a stator S, which is fixed to the housing, and a rotor R. The rotor R of the electric machine EM is connected rotationally conjointly to the first element E11, that is to say the sun gear SO1 of the first planetary gear set. A further difference is that the second element E21 of the first planetary gear set is configured as a ring gear HO1 and is connected rotationally conjointly to the first output shaft 11. Furthermore, the third element E31 of the first planetary gear set P1 is configured as a planet carrier PT1 and is connected rotationally conjointly to the first element E12 of the second planetary gear set P2, which in the present case is configured as a ring gear HO2. The second element E22 of the second planetary gear set is furthermore configured as a planet carrier PT2 and is fixed to the housing GG. Accordingly, the third element E32 is configured as a sun gear SO2 and is connected rotationally conjointly to the second output shaft. In this exemplary arrangement, a reversal of the direction of rotation of the input rotational speed occurs. Nesting of the planetary gear sets P1, P2 is not possible in this arrangement.

In other words, the torque continues to be introduced via the sun gear SO1 of the first planetary gear set P1, whereas the output is ensured via the ring gear HO1. In contrast to the situation in FIG. 2, the planet carrier of the first planetary gear set P1 is now connected rotationally conjointly to the ring gear HO2 of the second planetary gear set. In contrast to the exemplary arrangement in FIG. 2, the output of the second planetary gear set accordingly takes place via the sun gear SO2.

Figure 9:
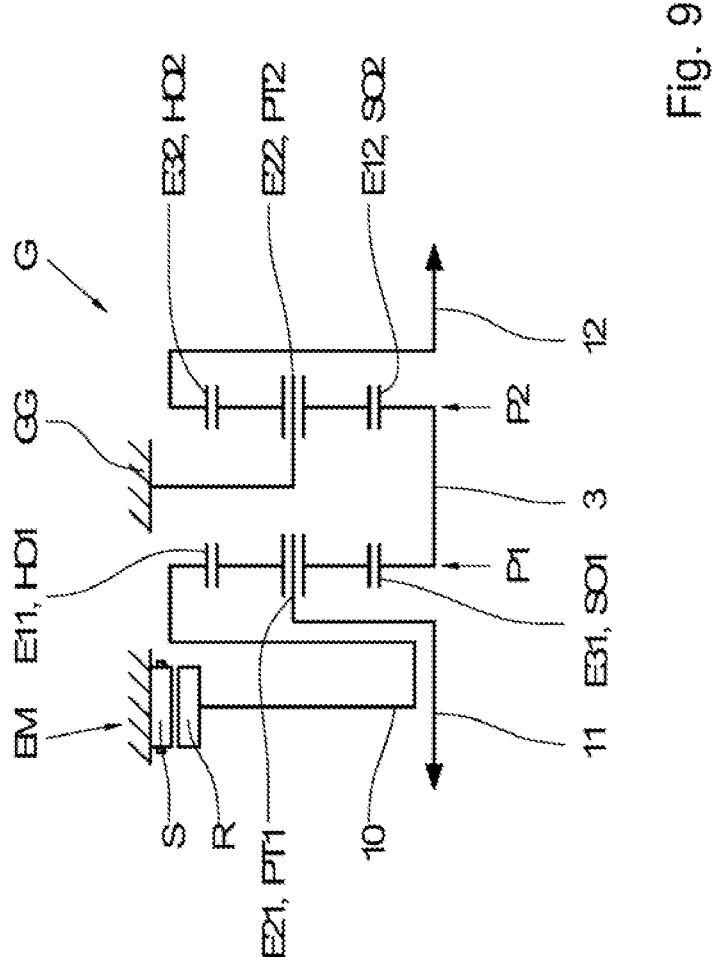

FIG. 9 shows a further exemplary arrangement of the transmission G. The arrangement has the following differences in relation to the arrangement shown in FIG. 2. Firstly, a drive machine in the form of an electric machine EM is provided, which has a stator S, which is fixed to the housing, and a rotor R. The rotor R is connected rotationally conjointly to the input shaft 10, which in turn is connected to the first element E11, which in the present case is configured as a ring gear HO1, of the first planetary gear set P1. The first output shaft 11 is in the present case connected to the second element E21, which in the present case is in the form of a planet carrier PT2, of the first planetary gear set P1. The third element E31 of the first planetary gear set P1, which in the present case is configured as a sun gear SO1, is connected rotationally conjointly to the first element E12, that is to say the sun gear SO2 of the second planetary gear set P2. The other elements of the second planetary gear set remain unchanged.

In contrast to the exemplary arrangement in FIG. 2, it is the case in the arrangement as per FIG. 9 that the introduction of the torque takes place via the ring gear HO1 of the first planetary gear set P1, whereas the output of the first planetary gear set P1 continues to be realized via the planet carrier PT1. By contrast to FIG. 2, the two planetary gear sets P1, P2 are connected via a common sun gear, which in the present case is in the form of a shaft 3.

Figure 9A:
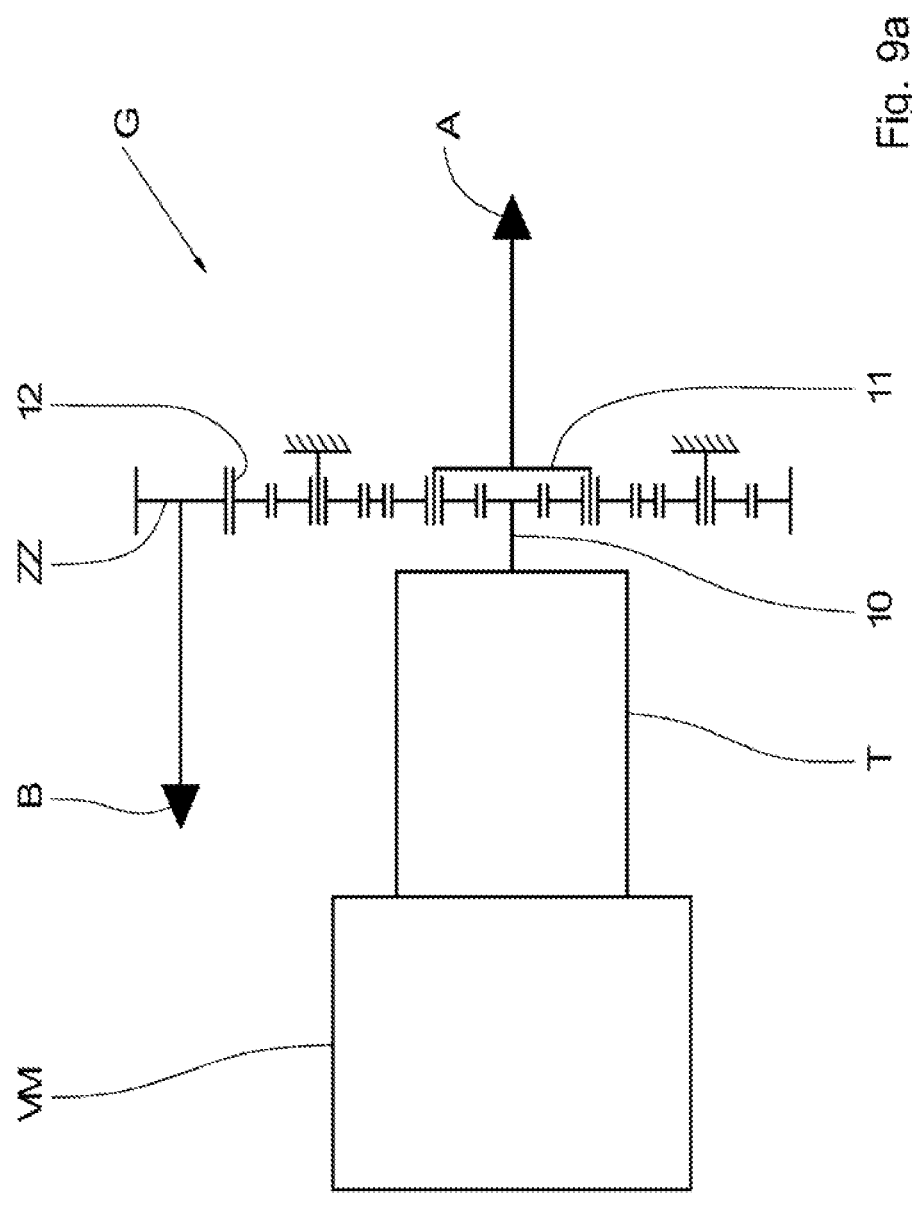

FIG. 9a shows a specific exemplary arrangement of the transmission G for the drivetrain from FIG. 1c. Output 12 transmits the torque to the rear axle A. Output 11 transmits the torque to the front axle B. As can be clearly seen, the output shafts 11, 12 are arranged axially parallel with respect to one another—and not coaxially with respect to one another. The second output shaft 12 of the second planetary gear set P2 meshes with an intermediate toothed gear ZZ, which in turn is connected to a shaft which in turn introduces the torque into a rear-axle differential (not illustrated).

Figure 10:
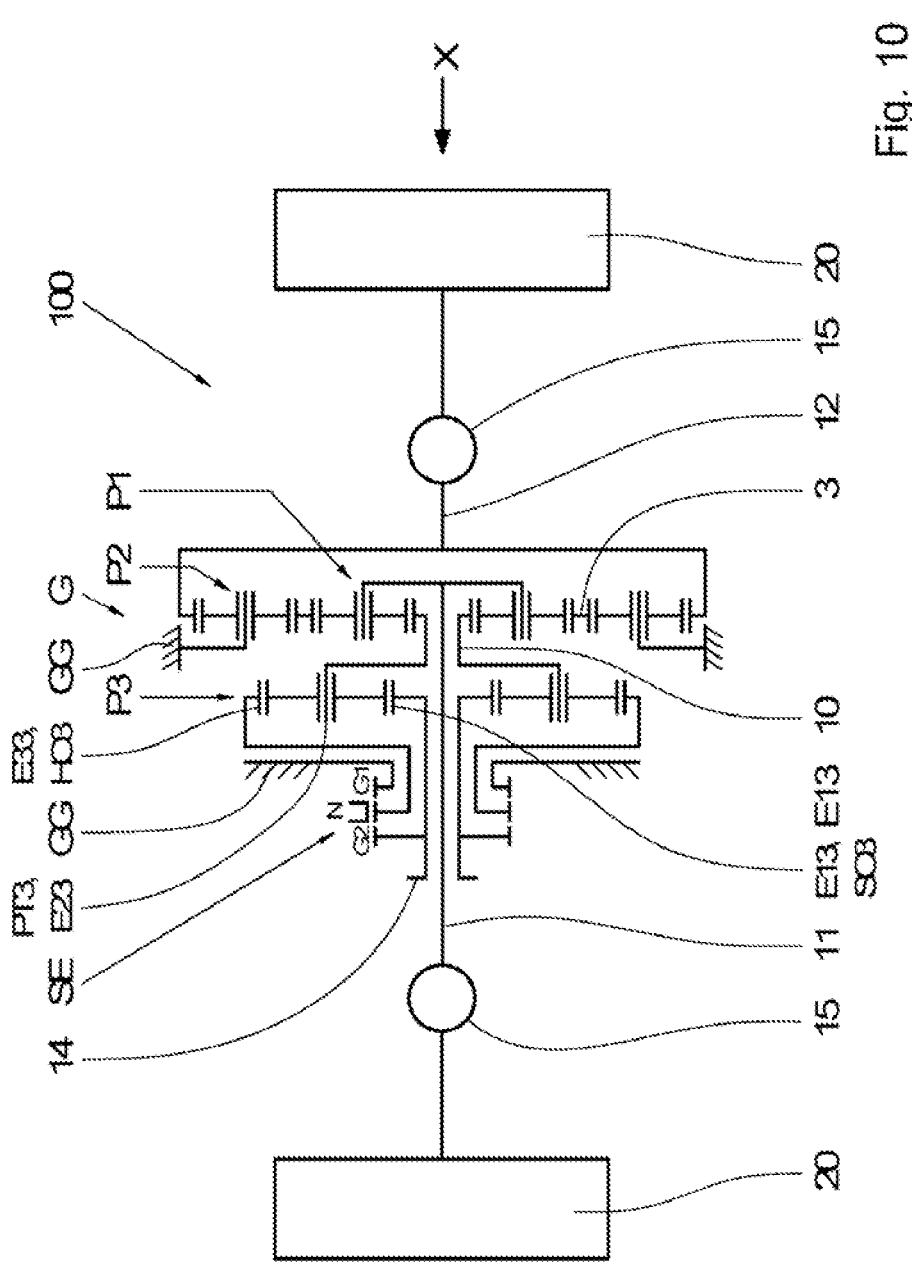
FIGS. 10-13 show a schematic view of a respective transmission such as can be used in the respective motor vehicle drivetrain from FIGS. 1a-1e, in a respective further exemplary arrangement.

FIG. 10 shows a drivetrain 100 of a vehicle with a transmission in an exemplary arrangement, wherein a transmission gearing in the form of a planetary gear P3 is additionally connected upstream of the transmission G.

The transmission G is the arrangement as per FIG. 3, to which reference is hereby made. The planetary gear set P3 is configured as a minus planetary gear set and has a first element E13, which is configured as a sun gear, a second element E23, which is configured as a planet carrier, and a third element E33, which in the present case is configured as a ring gear HO3. The second element E23 of the third planetary gear set is connected rotationally conjointly to the input shaft 10 of the transmission G.

Furthermore, a shift element SE is assigned to the planetary transmission P3. The shift element SE is configured to fix the third element E33 to the non-rotatable structural element GG. Furthermore, the shift element SE is configured to, in a second shift position, connect the third element E33 to the first element E13 of the third planetary gear set, that is to say to place these in a block state. If a planetary gear set is in a block state, the speed ratio is always 1, regardless of the number of teeth. In other words, the planetary gear set revolves as a block. In a third shift position, the third element E33 is not fixed to the housing, nor is the planetary gear set P3 in a block state. The shift element SE is in this case present in a neutral shift position. The first shift position of the shift element SE is denoted by the reference designation G1 which at the same time represents a first gear ratio stage. The second shift position is denoted by the reference designation G2, which at the same time represents a second gear ratio stage. The first element E13 of the planetary gear set P3 is connected via an input shaft 14 to a drive machine (not illustrated). If the shift element SE is in its neutral position, the drive torque introduced into the transmission gearing P3 is not transmitted to the input shaft 10 of the transmission G.

As can also be clearly seen from FIG. 10, the transmission gearing P3 is arranged coaxially with respect to the input shaft 10 and with respect to the output shafts 11, 12. In addition, it can be clearly seen how the first output shaft 11 is guided through the input shaft 10 designed as a hollow shaft and, over the further course, through the further shaft 14 designed as a hollow shaft. The two output shafts 11, 12 are each connected to a drive wheel 20. Constant velocity joints 15 are provided to allow wheel movements such as steering movement and/or spring compression. The shift element SE is illustrated here as a positively engaging double shift element. Single shift elements, in particular powershift elements, are also conceivable.

Figure 11:
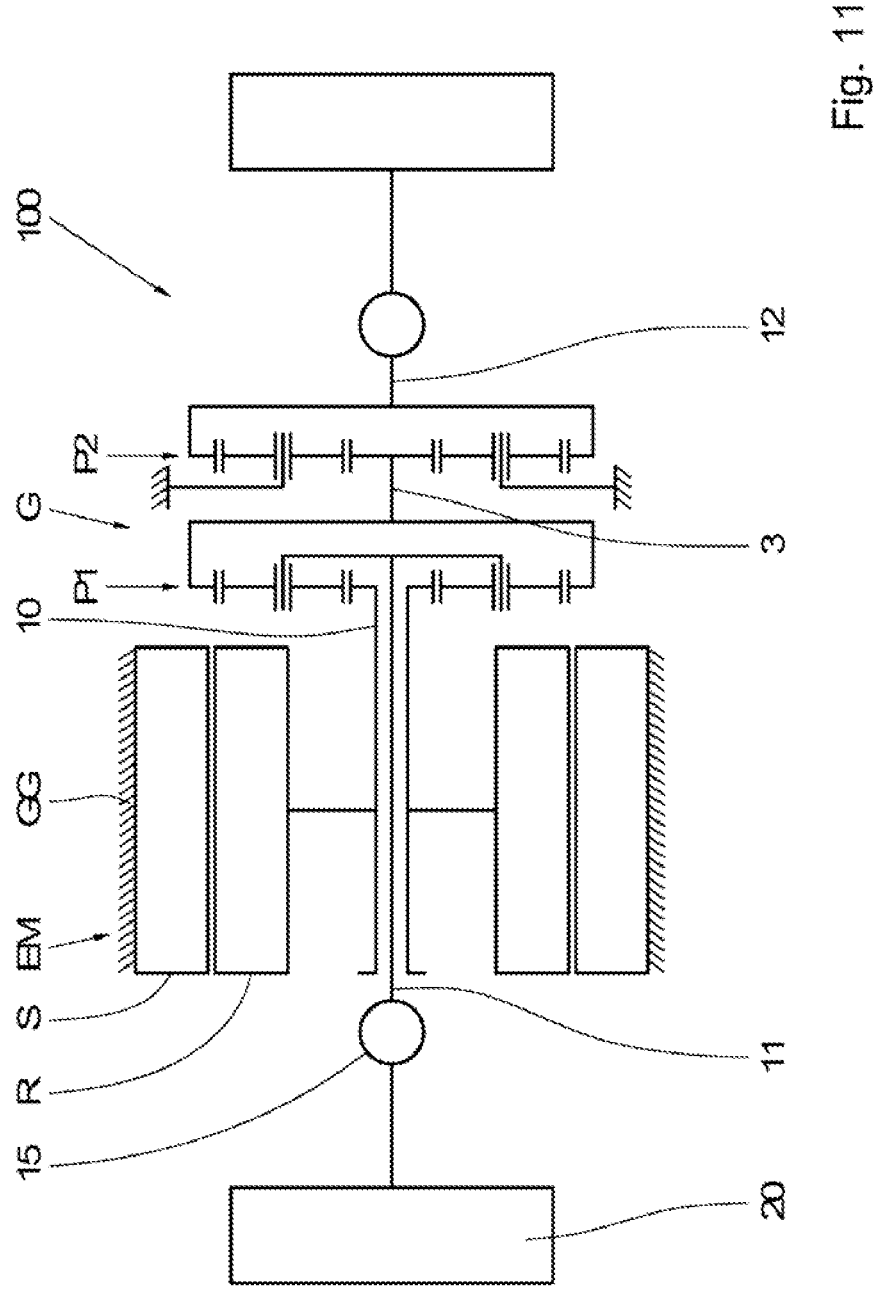

FIG. 11 shows a drivetrain of a vehicle having a transmission according to the disclosure in a further preferred embodiment. The transmission G is the preferred embodiment as per FIG. 2, to which reference is made. By contrast to FIG. 10, no transmission gearing is connected upstream in the embodiment as per FIG. 11. The drive machine is configured as an electric machine EM. The electric machine EM has a stator S, which is fixed to the housing, and a rotor R. The rotor R is connected rotationally conjointly to the input shaft 10. As can be clearly seen, the electric machine EM is arranged coaxially with respect to the input shaft 10 and with respect to the output shafts 11, 12. In addition, said electric machine is thus arranged coaxially with respect to the planetary gear sets P1, P2. The input shaft 10 is configured as a hollow shaft through which the first output shaft 11 is guided. Reference is otherwise made to the statements relating to FIG. 10.

Figure 12:
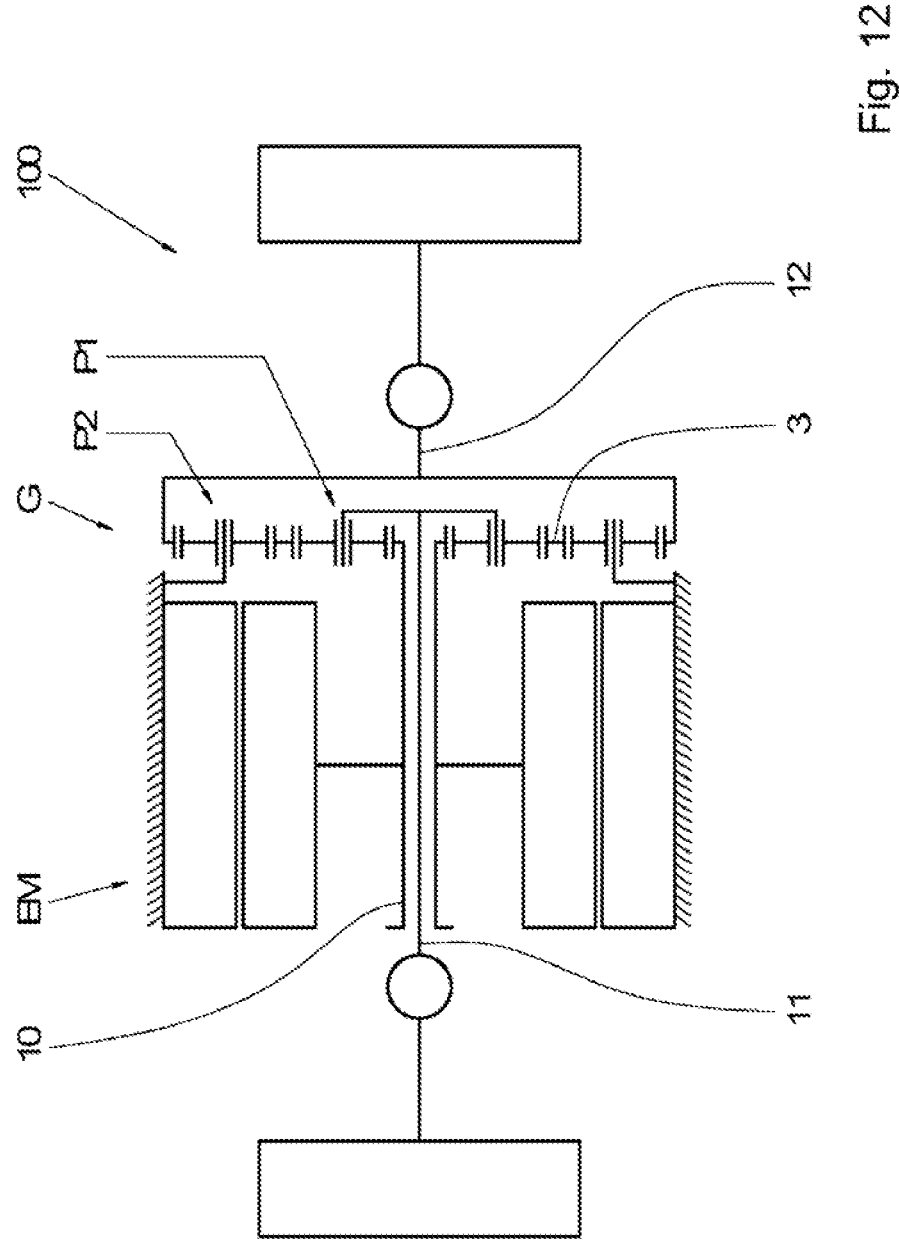

FIG. 12 shows a further drivetrain 100 with a transmission G in an exemplary arrangement. In contrast to the arrangement as per FIG. 11, the planetary gear sets P1, P2 are arranged not axially adjacent to one another but radially one above the other, that is to say in nested fashion. The transmission G is thus the arrangement from FIG. 3. Reference is otherwise made to the statements relating to FIG. 11 and FIG. 3.

Figure 13:
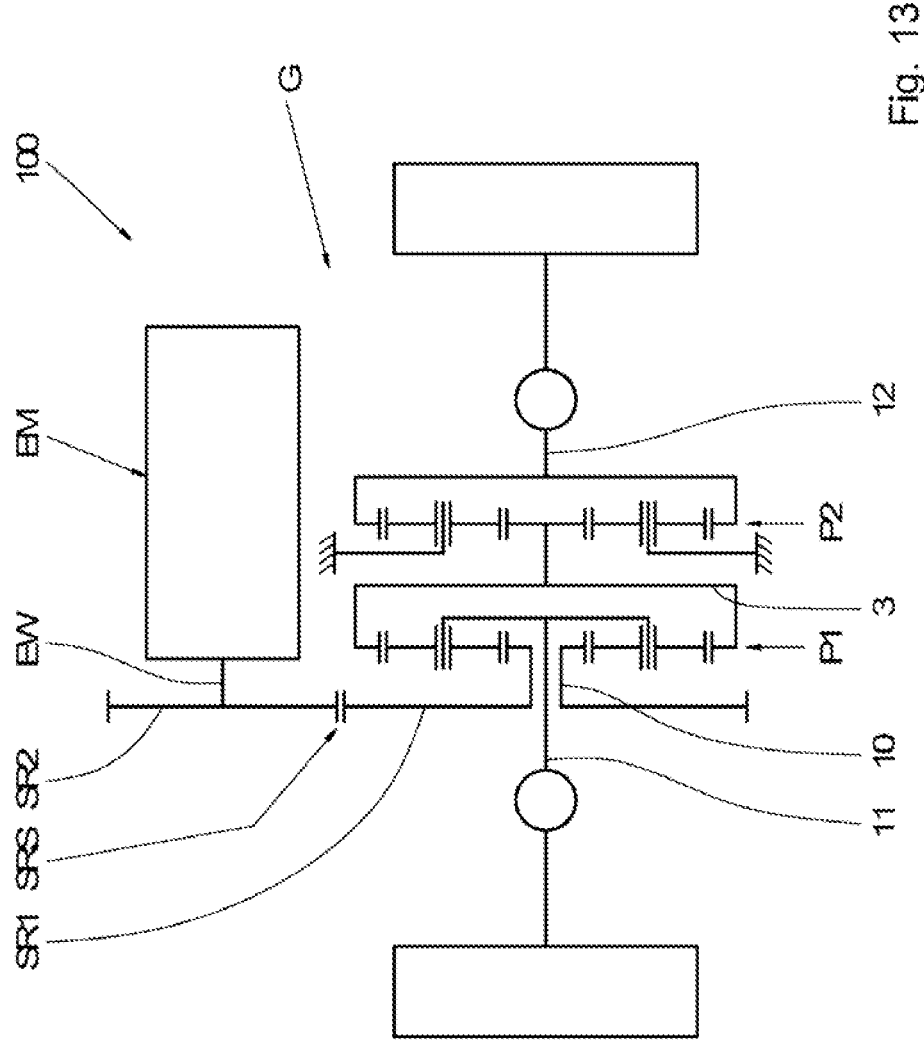

FIG. 13 shows a drivetrain 100 in a further exemplary arrangement. This arrangement is similar to the arrangement as per FIG. 11, wherein, by contrast thereto, the electric machine EM is arranged not coaxially but axially parallel with respect to the transmission G. A connection is realized here via a spur gear stage SRS, which is composed of a first spur gear SR1 and a second spur gear SR2. The first spur gear SR1 is in this case connected rotationally conjointly to the input shaft 10. The spur gear SR1 is then in tooth meshing engagement with the spur gear SR2, which is located rotationally conjointly on an input shaft EW of the electric machine EM and which, within the electric machine EM, produces the connection to the rotor (not illustrated in any more detail here) of the electric machine EM.

Otherwise, the exemplary arrangement as per FIG. 13 corresponds to the arrangement as per FIG. 11, such that reference is made to the description given with regard thereto.

Figure 14:
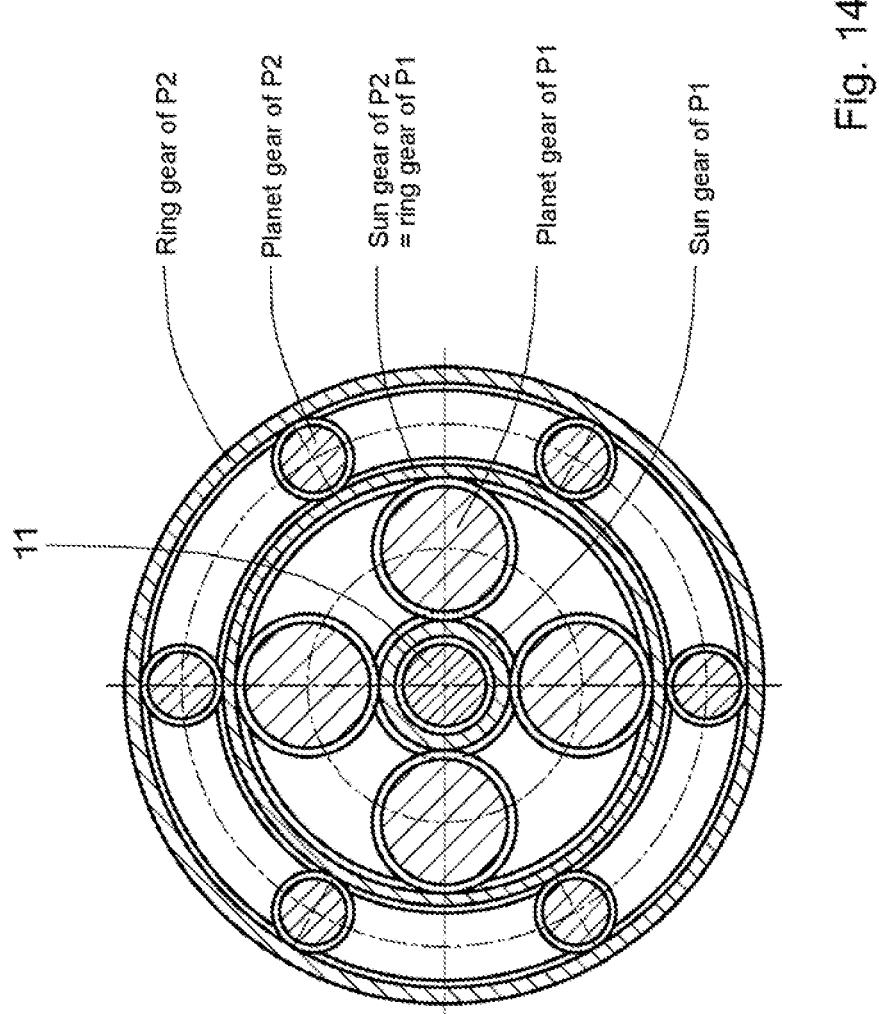
FIG. 14 shows the arrangement as per FIG. 3 in a sectional view.

FIG. 14 shows the arrangement of the transmission G as per FIG. 3 in a sectional view. The shaft situated in the center is the output shaft 11. In this drawing, the input shaft 10 coincides with the sun gear of P1, that is to say, in other words, the input shaft 10 is connected to a sun gear of the first planetary gear set P1. The sun gear of the first planetary gear set P1 is in turn in tooth meshing engagement with planet gears of the first planetary gear set P1. The planet gears of the first planetary gear set P1 in turn mesh with the surrounding ring gear of the first planetary gear set P1, wherein the ring gear simultaneously forms the sun gear of the second planetary gear set P2. The sun gear of the second planetary gear set P2 is in turn in tooth meshing engagement with planet gears of the second planetary gear set P2. The planet gears of the second planetary gear set P2 are in turn in tooth meshing engagement with the ring gear, which surrounds the planet gears, of the second planetary gear set P2.

As can be clearly seen, the number of planets of the second planetary gear set is greater than the number of planets of the first planetary gear set. According to this exemplary arrangement, the second planetary gear set P2 has six planets, whereas the first planetary gear set P1 has four planets.

A high transmission ratio can be implemented by this configuration, which in turn makes possible a particularly compact and cost-effective electric machine.

A high transmission ratio however leads, in accordance with the calculation rule, $$i_{02} = \frac{1}{i_{01}} - 1$$

to a static transmission ratio of lower magnitude at the second planetary gear set P2. A lower static transmission ratio in turn leads to a small planet diameter. A small planetary diameter in turn impairs the tooth meshing engagement and reduces the installation space for the planet bearings.

It has been found that a higher number of planets of the second planetary gear set in relation to the first planetary gear set counteracts this effect.

Figure 15:
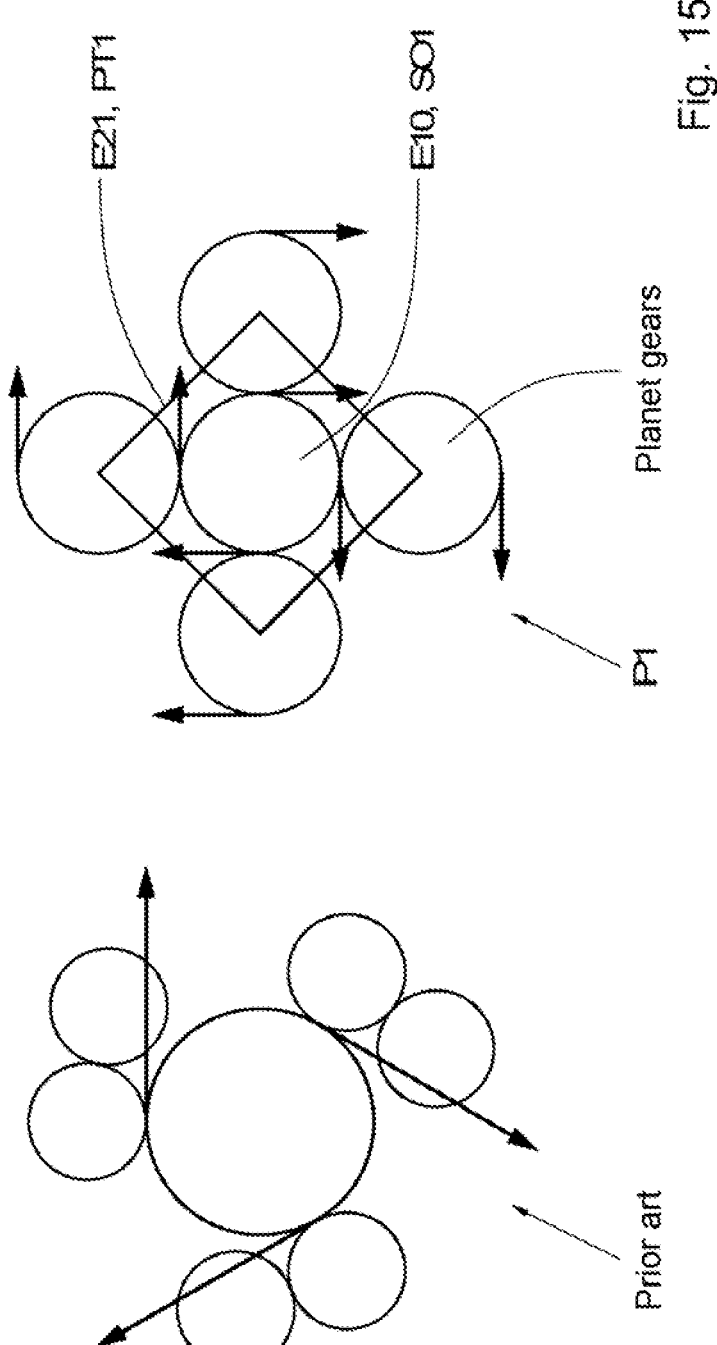
FIGS. 15-18 show a schematic illustration of the functional principle of the disclosure.
Figure 16:
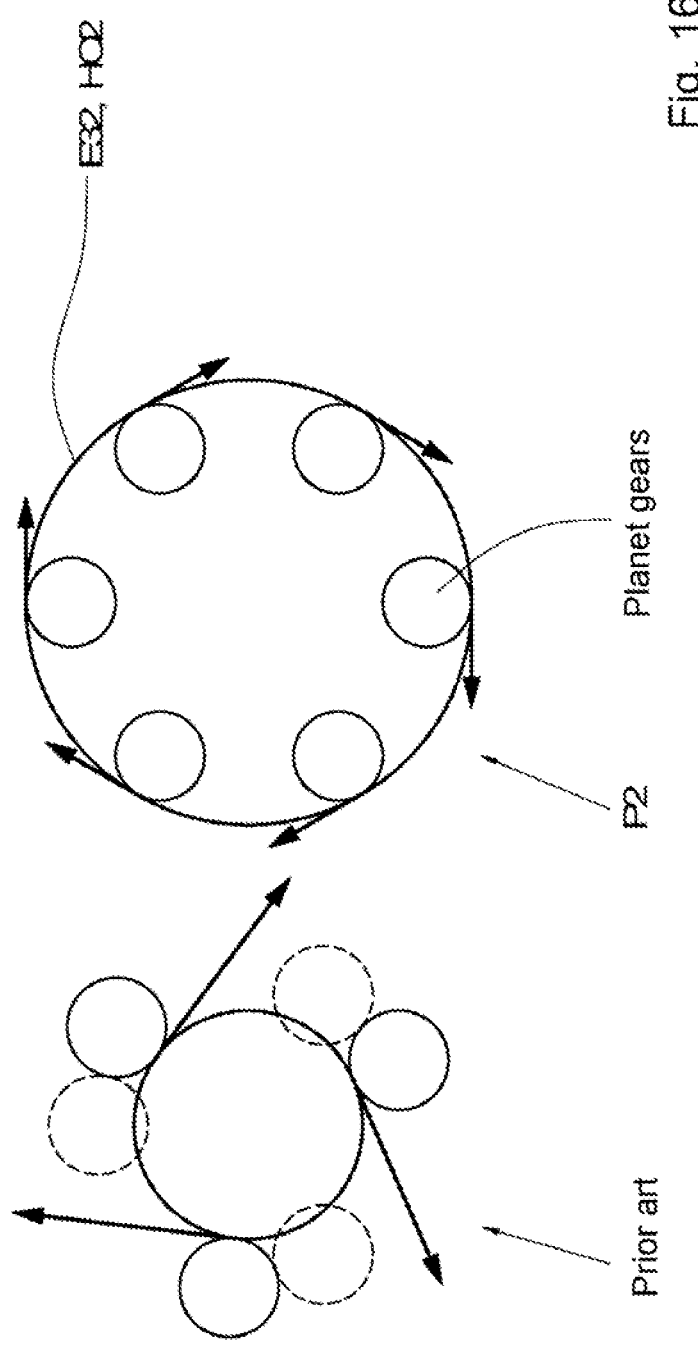
Figure 17:
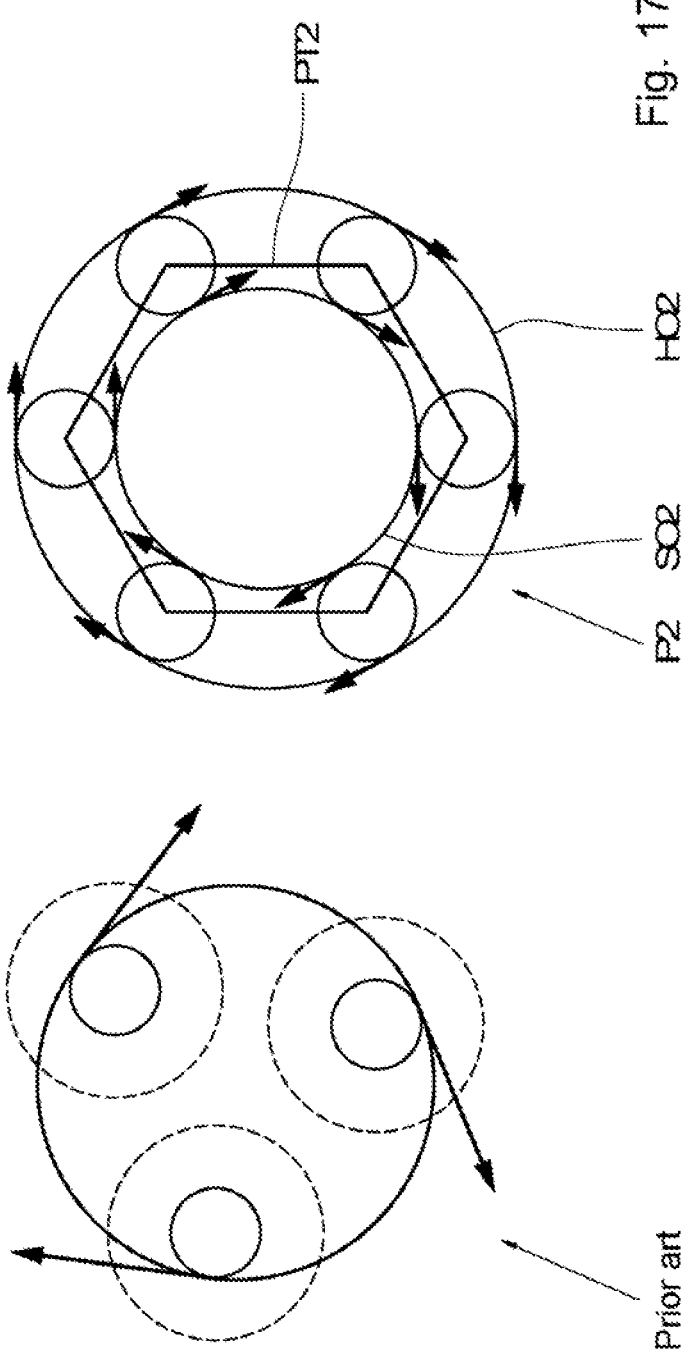

The following FIGS. 15 to 17 show the introduction of force and force support configurations of the disclosure in relation to the prior art, such as DE 10 2011 079 975 A1. The prior art is compared with the exemplary arrangement with two minus planetary transmissions, as have been described inter alia in FIGS. 2 and 3. However, this consideration also applies analogously to the other arrangements.

The following generally applies to FIGS. 15 to 17:

At the first planetary gear set P1, the torque of the input shaft 10 is converted into the output torque for the first output 11. The third element E31 of the first planetary gear set P1 (which is at the same time the first element E12 of the second planetary gear set P2) is driven backward by its reaction moment. The backward movement of the third element E31 is permitted, such that a proportion of the mechanical drive power (preferably 50% in the case of the transverse differential and straight-ahead travel) is conducted through the first planet set P1 into the second planet set.

Furthermore, the backward rotation causes the speed ratio with respect to the first output 11 to be increased (static transmission ratio i0=3 would allow only a speed ratio of i=4 in the case of a fixed ring gear).

In the second planetary gear set P2, the direction of rotation (backward) introduced at the first element (E12) is, with the aid of a housing support (E22), reversed (forward) into the output movement of the second output (12). Here, the torque introduced into the second planetary set P2 and the torque conducted out to the second output (12) are summed to give the housing support torque. Here, the second planet set P2 transmits only that proportion of the mechanical power that is conducted to the second output (12) (typically 50%). Only a proportion of the power is applied to the second planetary set P2, such that the overall efficiency is positively influenced.

In the prior art, a torque conversion usually takes place with the aid of a housing support. The reaction moment of the transmission gearing is in this case conducted directly into the housing and does not serve to generate the second output torque. The result is that a transmission must firstly be configured for the sum torque of the two output shafts (generally double the torque). A separate differential transmission is then required to divide this sum torque, which is not required in this form at any location, into two output torques again.

The individual FIGS. 15 to 18 specifically show the following:

FIG. 15 schematically shows the first planetary gear set P1 of the transmission G (right) and a first stage of the spur gear differential from the prior art (left). The introduction of force from the planet gears to the sun gear takes place in parallel via 3 static, that is to say fixed, tooth meshing engagement points. The output to the first output shaft takes place via the sun gear.

By contrast to this, the introduction of force according to an exemplary arrangement takes place in parallel via eight moving, that is to say rotating, tooth meshing engagement points. There are four tooth meshing engagement points between sun gear SO1 and four planet gears. Four further tooth meshing engagement points act between a respective planet gear and the ring gear HO1 (not illustrated). The output to the first output shaft 11 takes place via the planet gear carrier PT1. The technical effect lies in the significantly lower tooth forces that act on the first planetary gear set.

FIG. 16 schematically shows the second planetary gear set P2 of the transmission G (right) and a second stage of the stepped planet from the prior art (left). The introduction of force from the planet gears to the sun gear takes place in parallel via 3 static, that is to say fixed, tooth meshing engagement points. The output to the second output shaft takes place via the sun gear.

By contrast to this, the introduction of force into the second planetary gear set P2 according to the exemplary arrangement takes place in parallel via 6 moving, that is to say rotating, tooth meshing engagement points. The six tooth meshing engagement points act in each case between one of the six planet gears and the ring gear HO2. The fixed planet carrier PT2, which carries the six planet gears and the sun gear SO2, are not illustrated. The output to the second output shaft 12 takes place via the ring gear HO2. The technical effect lies in the significantly lower tooth forces that act on the second planetary gear set owing to the larger effective diameter and owing to the larger possible number of planets.

FIG. 17 schematically shows the introduction of the supporting torque into the housing. The introduction of force in the case of the stepped planet according to the prior art (left) takes place into a fixed ring gear via 3 parallel tooth meshing engagement points.

The introduction of force according to the exemplary arrangement takes place into the fixed planet carrier PT2 via 12 parallel tooth meshing engagement points. Six tooth meshing engagement points act between the sun gear 502 and the six planet gears of the second planetary gear set. The six other tooth meshing engagement points act between each planet gear of the second planetary gear set and the ring gear HO2. The technical effect lies in the significantly lower tooth forces that act on the second planet carrier PT2.

Figure 18:
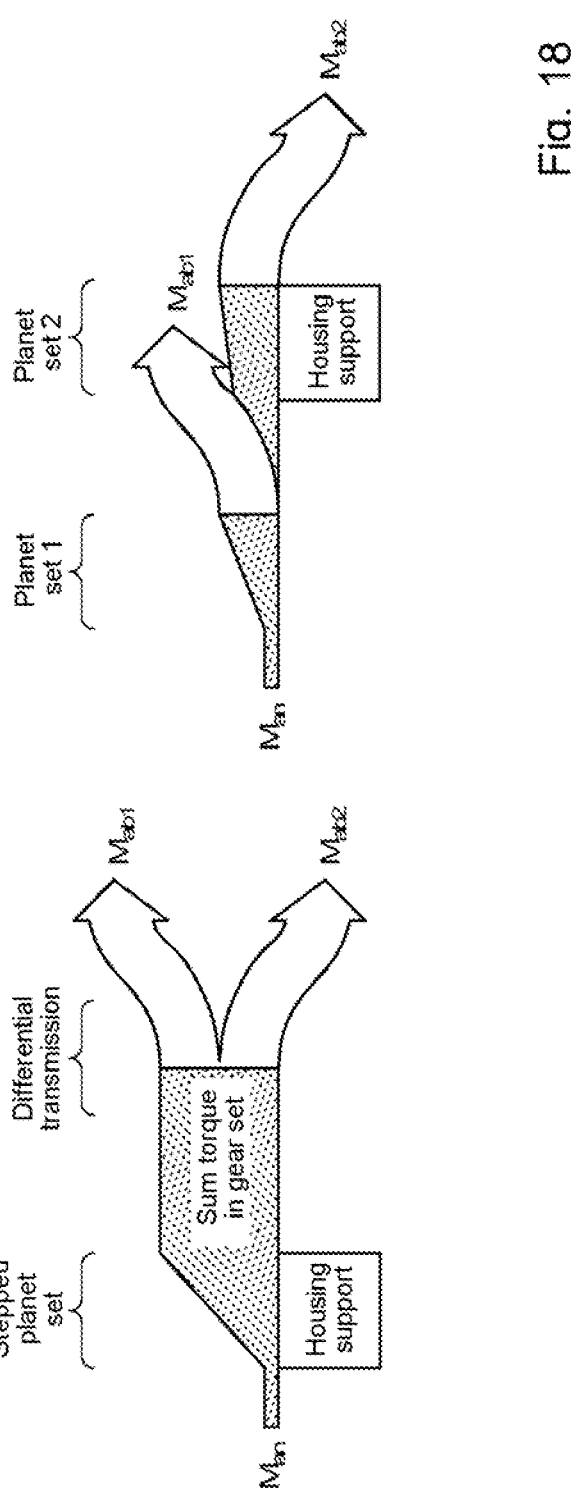

FIG. 18 shows the principle illustrated in more detail in FIGS. 15 to 17 in a further view.

The greatest torque hi the gear set according to the disclosure (right) corresponds to the output torque of a single gear. Only the housing support has a high torque factor in accordance with physical principles.

The stepped planet set according to the prior art (left) generates the full output torque, that is to say the sum torque of both wheels, from one input torque $M_{an}$. The differential divides this high moment into two half wheel moments $M_{an1}$ and $M_{an2}$.

The figure symbolically illustrates the torques in terms of magnitude on their path through the transmission. Directions of rotation are not apparent from this.

FIG. 19 gives an overview of the calculation rule for the static transmission ratio of the individual arrangements. These each give rise, if transmission losses are neglected, to an output torque of equal magnitude and with the same sign at both output shafts (11, 12). $i_{01}$ denotes the static transmission ratio of the first planetary gear set P1. $i_{02}$ denotes the static transmission ratio of the second planetary gear set P2. One of the planetary gear set configurations with corresponding static transmission ratio may be selected depending on the use of the transmission.

The disclosure has been described and explained comprehensively with reference to the drawings and the description. The description and explanation are to be understood as examples and not as being limiting. The disclosure is not limited to the disclosed arrangements. Other arrangements or variations will become apparent to a person skilled in the art from the use the present disclosure and from a close analysis of the drawings, the disclosure and the following claims.

In the patent claims, the words "comprising" and "having" do not exclude the presence of further elements or steps. The indefinite article "a" or "an" does not exclude the presence of a multiplicity. A single element or a single unit may perform the functions of several of the units mentioned in the patent claims. The mere mention of certain measures in several different dependent patent claims should not be understood to mean that a combination of these measures cannot likewise be advantageously used.

The invention claimed is:

1. A transmission, comprising an input shaft, a first output shaft, a second output shaft, a first planetary gear set and a second planetary gear set connected to the first planetary gear set, wherein the planetary gear sets each comprise multiple elements, wherein the input shaft, the two output shafts, the planetary gear sets and elements thereof are arranged and are configured such that a torque introduced via the input shaft is converted and divided between the two output shafts in a defined ratio, and the generation of a sum torque is prevented, wherein at least one element of the first planetary gear set is connected rotationally conjointly to another element of the second planetary gear set, wherein a further element of the second planetary gear set is fixed to a non-rotatable structural element, wherein the second planetary gear set is a minus planetary gear set, wherein the input shaft is connected rotationally conjointly to a ring gear of the first planetary gear set, wherein the first output shaft is connected rotationally conjointly to a planet carrier of the first planetary gear set, wherein a sun gear of the first planetary gear set is connected rotationally conjointly to a sun gear of the second planetary gear set, wherein a planet carrier of the second planetary gear set is fixed to a non-rotatable structural element of the transmission, wherein the second output shaft is connected rotationally conjointly to a ring gear of the second planetary gear set, wherein a pitch of the toothing on the sun gear of the first planetary gear set and on the sun gear of the second planetary gear set is identical, and wherein a static transmission ratio of the second planetary set is calculated at least approximately from a static transmission ratio of the first planetary set minus 1.

2. The transmission as claimed in claim 1, wherein the two planetary gear sets are arranged axially adjacent to one another.

3. The transmission as claimed in claim 1, wherein toothings of the two interconnected elements of the first and second planetary gear sets are formed on the same structural part.

4. The transmission as claimed in claim 1, further comprising a transmission gearing or a multi-ratio transmission.

5. The transmission as claimed in claim 1, wherein the input shaft is connected to a drive machine for the introduction of a torque into the transmission.

6. The transmission as claimed in claim 5, wherein the drive machine is an electric machine and wherein the electric machine is arranged coaxially with respect to the input shaft and wherein the first output shaft is guided through a rotor of the electric machine.

7. The transmission as claimed in claim 5, wherein the drive machine is arranged so as to be axially parallel with respect to the input shaft.

8. The transmission as claimed in claim 5, wherein the drive machine is installed transversely with respect to a direction of travel.

9. The transmission as claimed in claim 1, wherein the two output shafts are connected rotationally conjointly to wheels of a vehicle.

10. The transmission as claimed in claim 1, wherein the two output shafts distribute the introduced torque to different axles of a vehicle.

11. The transmission as claimed in claim 1, wherein the first planetary gear set is either a minus or a plus planetary gear set.

12. The transmission as claimed in claim 1, wherein a number of planets of the second planetary gear set is greater than a number of planets of the first planetary gear set.

13. The transmission as claimed in claim 1, wherein the number of planets of the first planetary gear set is less than or equal to four.

14. The transmission as claimed in claim 1, wherein the number of planets of the first planetary gear set is three or four, and the number of planets of the second planetary gear set is between five and eight.

15. The transmission as claimed in claim 1, wherein one or more speed ratio stages and/or a traction mechanism drive is interposed between the drive machine and the planetary gear sets.

16. The transmission as claimed in claim 1, wherein the sun gears of the first and second planetary gear sets are connected rotationally conjointly via a shaft, and wherein a torque transmitting portion of the shaft, along which torque is transmittable from the sun gear of the first planetary gear set to the sun gear of the second planetary gear, extends axially only between the sun gears of the first and second planetary gear sets.

* * * * *